US 9,317,324 B2

(12) United States Patent
Van Vechten et al.

(10) Patent No.: US 9,317,324 B2
(45) Date of Patent: Apr. 19, 2016

(54) AUTOMATIC SERVICE LIFECYCLE MANAGEMENT

(75) Inventors: Kevin Van Vechten, San Francisco, CA (US); Damien Pascal Sorresso, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 927 days.

(21) Appl. No.: 12/980,789

(22) Filed: Dec. 29, 2010

(65) Prior Publication Data

US 2012/0174119 A1 Jul. 5, 2012

(51) Int. Cl.
| | |
|---|---|
| G06F 13/00 | (2006.01) |
| G06F 9/46 | (2006.01) |
| G06F 9/44 | (2006.01) |
| G06F 12/00 | (2006.01) |
| G06F 9/48 | (2006.01) |
| G06F 9/445 | (2006.01) |
| G06F 9/54 | (2006.01) |

(52) U.S. Cl.
CPC ............ *G06F 9/485* (2013.01); *G06F 9/44521* (2013.01); *G06F 9/547* (2013.01); *G06F 9/54* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 5,355,501 A | 10/1994 | Gross et al. | |
| 6,694,346 B1 * | 2/2004 | Aman et al. | ............... 718/104 |
| 6,868,442 B1 * | 3/2005 | Burdeau | ............. 709/223 |
| 8,296,776 B2 | 10/2012 | Zarzycki et al. | |
| 2001/0013074 A1 * | 8/2001 | Marslano | ............... 709/330 |
| 2003/0055890 A1 * | 3/2003 | Senda | ................ 709/203 |
| 2004/0244004 A1 * | 12/2004 | Pardon | ............ G06F 9/466 718/100 |
| 2006/0174252 A1 * | 8/2006 | Besbris et al. | .............. 719/330 |
| 2010/0223344 A1 * | 9/2010 | Little | ................. 709/206 |
| 2010/0332677 A1 * | 12/2010 | Tian | .................... 709/233 |
| 2013/0117747 A1 * | 5/2013 | Balko | ............ G06F 9/466 718/100 |

OTHER PUBLICATIONS

Bishop et al. "Java Tip 67: Lazy instantiation Balancing performance and resource usage", Feb. 1999.*
Corsaro et al. "Virtual Component a Design Pattern for Memory-Contrained Embedded Application", 2002, pp. 1-13.*
Msdn, How to: Create and Terminate Threads (C# Programming Guide), 2008, pp. 1-5.*

* cited by examiner

*Primary Examiner* — H S Sough
*Assistant Examiner* — Phuong Hoang
(74) *Attorney, Agent, or Firm* — Blakely, Sokoloff, Taylor & Zafman LLP

(57) ABSTRACT

A method is described for assisting execution of an application that is implemented with individual blocks of program code that are executable with separate processes. The method includes receiving an indication that a first of the blocks desires availability of a service provided by a second of the blocks. The method further includes, in response to the receipt of the indication, instantiating an instance of code to handle the delivery of inter process requests from the first block to the second block. The method further includes, in response to the instance of code receiving a first request from the first block for the service, instantiating the second block for execution with a different process than the first block's process. The method further includes detecting that the second block has no pending requests and has not, over a period of time, received any new requests, and, terminating the second block in response.

30 Claims, 9 Drawing Sheets

AUTOMATIC SERVICE LIFECYCLE MANAGEMENT

BACKGROUND

Concurrent execution of multiple processes has become more and more of a mainstream runtime environment for present day desktop computing systems and mobile computing systems (including laptop, notebook, netbook, tablet and smartphone systems). A "process" is the execution of a sequence of code to accomplish a particular task. Concurrent execution of multiple processes is the concurrent execution of multiple sequences of code over a same time period to accomplish multiple, respective tasks. In various environments multiple processes are understood to have independent address spaces. A possible benefit of separate address spaces is that one process cannot inadvertently disrupt the data of another process.

In the case of application software, application developers may wish to try utilize multiple processes for their particular application. However, writing application software for a multiple process environment may present some challenges. One issue pertains to inter process communication. Here, for example, the application software developer may granularize the overall application into smaller constituent regions or blocks with the idea that different blocks can be run concurrently on different processes. Even so, however, blocks will need to communicate with other blocks within the same application in order to effect cohesive overall flow of the application as a whole.

For instance, if a first block of the program recognizes that a second block of the program can be used to perform a specific task concurrently with the operation of the first block, the first block should be able to communicate with the second block in order to trigger the second block into operation. Unfortunately, such communication between processes typically involves knowledge of low level system details that, ideally, application software developers should not have to concern themselves with.

Another issue concerns the memory footprint of the application. Specifically, inefficient memory use results if certain blocks of the application are instantiated in memory and ready to operate, but, have either never been called upon to operate or are not expected to be called on to operate.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
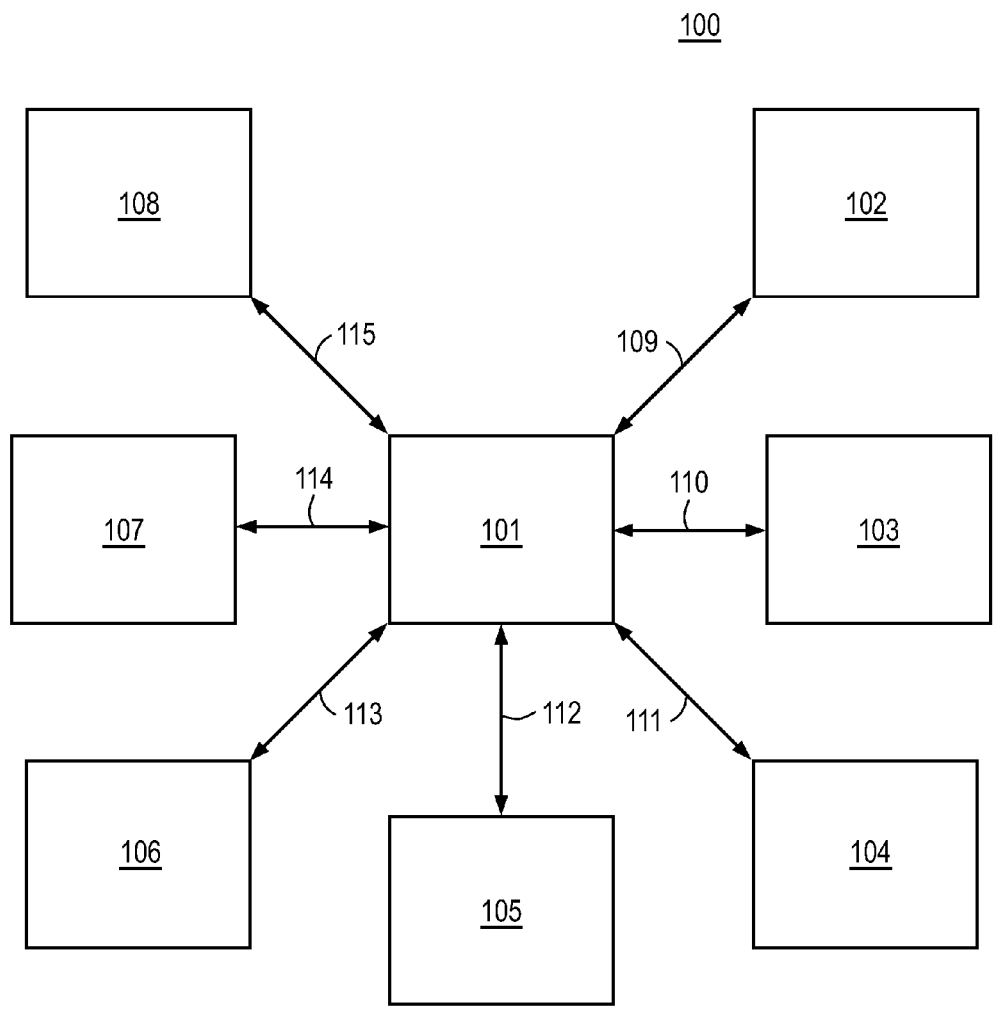
FIG. 1 shows a possible application software program architecture.

FIG. 1 shows an exemplary architecture of an application software program 100 that has been granularized into different blocks 101-108, where, each of blocks 101-108 may be concurrently executed on its own respective process. In an embodiment, a main or master execution block 101 substantially directs overall program flow and operation of the application by calling on the other blocks as needed. Here, each of the non main blocks 102-108 may be viewed as providing a "service" for the main execution block 101, where, the service corresponds to the specific task (or tasks) the non main block is designed to execute. It will be appreciated that a main execution block surrounded by services is just one architectural approach that is presented initially as an example. Alternative architectures are discussed further below.

Inter process communication takes place through conduits 109-115. In a further embodiment, a service is invoked by the main execution block 101 by issuing a request message to the conduit that connects the main execution block to the service being invoked. For instance, if the main execution block 101 desires to use service 102, main execution block issues a request message to conduit 109. Subsequently, once service 102 completes its task in response to the request, the service 102 sends a response message to the main execution block over conduit 109. Having successfully invoked the service 102, the main execution block 101 continues forward with execution of the overall application.

As alluded to above in the Background, if services 102-108 represent the set of all potential services for the application 100 that main execution block 101 "might" call upon during operation of the application, it is apt to be an inefficient use of memory to load into memory each of the blocks of code for the respective services 102-108 when the application is first launched. Here, the invocation of a particular service is likely to be a function of a particular "state" of the main execution block 101 (e.g., the values of the main execution block's variables). It is possible that, because of the main execution block's state, some services of the application have little or no likelihood of being called upon by the main execution block. As such, memory resources are better utilized if such services are not loaded in memory.

Instead, as described in more detail further below, a more efficient approach is to load a service into memory when it is needed, or at least when the state of the application is such that there is an increased likelihood that a service might be needed. Moreover, further memory efficiencies may be realized if a determination is made that a particular service that has been loaded into memory is apt not to be called upon again. In this case, the region of memory where the service's corresponding block of code resides may be made available for other system uses. That is, the unused service is terminated. In addition to the above described memory savings, compartmentalization of an application into a number different services also improves the resilience of the application through fault isolation and recovery. That is, a crash in one process does not necessarily terminate the entire application, and the service process that crashed can be automatically relaunched in response to a crash as easily as it could be relaunched in response to an idle-exit timeout (as described in more detail further below).

Figure 2A:
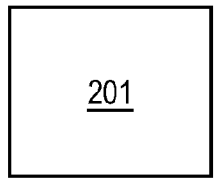
FIGS. 2a through 2h demonstrate a procedure for instantiating and terminating services that run on different respective processes than a block of program code that calls upon the services.

FIGS. 2a through 2h pertain to an example of an application that operates as discussed above. Referring to FIG. 2a, according to one embodiment, when an application is initially loaded, only the main execution block 201 is loaded into memory, and, the blocks of code for the surrounding services are not loaded into memory at this time. As part of the initialization process of the application, however, the set of services that the main execution block 201 could invoke is advertised to the main execution block 201 so that the main execution block understands what services are available.

For instance, an embedded service provided by the platform (which may be the same service that provides inter process communication as described below) scans the application to identify the various services that the application has the potential to invoke. The embedded service clears any/all such services through a security authentication and/or authorization process, and, provides a formal name or other identifier for each such service to the main execution block.

It is pertinent to note that, according to one approach, the services that are advertised to the main execution block 201 are a mixture of services written by the application developer, and, services provided by the underlying platform (e.g., operating system (OS)). In this manner, the provider of the underlying platform can integrate various application services as part of the platform which saves the developer the time and expense of having to write custom code for these same services. For example, according to one embodiment, the services that are provided by the underlying platform include (to name a few): 1) an image decoder service that decodes images according to a particular industry standard (e.g., an H264 decoder); 2) a network authentication service that performs authentication procedures according to a particular industry standard (e.g., SAML); 3) a parser that parses text documents written according to an industry standard (e.g., an XML parser); 4) a service that provides arbitrated access to a system resource (such as a disk drive or network interface).

With these services being provided by the underlying platform and made available to an application written for the platform, the application developer need not expend resources writing custom code/services for functions that perform these same services. Here, as the platform provider begins to make available more and more services for "basic" or "fundamental" routines (such as any routine whose functions are specified by an industry standard), the developer's development efforts may be more streamlined towards routines that are custom to the specific application being developed (e.g., the unique logic of the application). In this case, the application developer need only provide the application in the form of the main execution block and the application's application specific services.

As mentioned just above, the advertisement of services to the main execution block 201 may include both services that are provided as part of the platform and those that were written by the application developer. As will be more apparent further below, architecturally speaking, in an embodiment, there is no substantial difference as to the manner in which the services provided by the platform are instantiated and the manner in which the services written by the application developer are instantiated. That is, during the services advertisement phase of the application initialization process, the main execution block 201 becomes aware of custom made services provided by the application developer and basic services provided as part of the underlying platform. Over the course of program flow the main execution block invokes various ones of these services (e.g., as needed) without there being any substantial difference as to the manner in which they are invoked and instantiated.

Figure 2B:
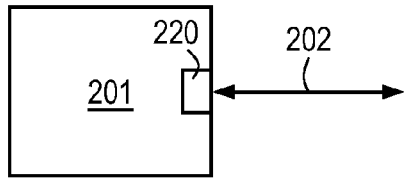
Figure 2C:
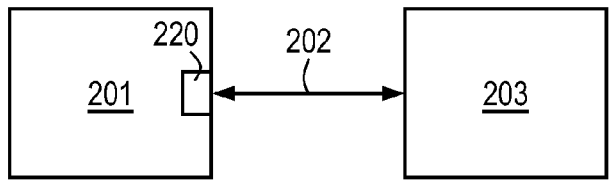

FIGS. 2b and 2c pertain to the first instantiation of a service 203. In this example, again, the source of the service may be the application developer or the underlying platform. In an embodiment, the main execution block 201 causes the service to be instantiated by requesting it's instantiation (as the main execution block 201 was made aware of the available services, it merely has to ask for any one of these services in order to instantiate it). Here, the main execution block 201 may ask for the service because it needs to use it, or, because the state of the application has reached a condition that makes actual future use of the service more likely.

In response to the main execution block's asking for the service, a dedicated connection 202 for issuing request messages to the service and receiving subsequent reply messages from the service is established. In an embodiment, the establishment of the connection is effected by providing a handler 220 with corresponding API to the main execution block 201. In an embodiment, part of the service advertisement is a description of the service's input parameters and output product(s). The handler 220 is code that runs on the main execution block's process, receives the input parameters from the main execution block and forwards them to the service (which is running on a different process than the handler's and main execution block's process). When the service has produced the output product(s) responsive to the received input parameters, the handler 220 receives the output product(s) from the service and presents them to the main execution block 201. Here, because the targeted service is running on a different process than the main execution block 201, in an embodiment where the different processes have independent address spaces, the request for the service is communicated explicitly by the main execution block's process.

In an embodiment, when the handler 220 for the service is instantiated, the service itself (or, said another way, the service's program code) is not instantiated (loaded into memory). Here, as the main execution block 201 may request a service merely because the state of the application has reached a point where an actual need for the service is more likely, the service's actual use is not guaranteed. As such, instantiation of the service's code on its respective process is triggered when the service's handler 220 actually receives a request (e.g., with input parameters) for the service. In this approach, memory usage is conserved because memory is not populated with the service's substantive operational code until it is actually needed.

The situation depicted in FIG. 2b, where an inter process communicative channel 202 to a service has been instantiated but the service itself has not, can therefore remain for an extended period of time. In a further embodiment, once constructed, the communication channel 202 is never torn down unless the application itself is terminated.

FIG. 2c shows the situation after the main execution block 201 has issued a request to the service. Here, in response to the main execution block 201 issuing a request to the inter-process communication channel 202 (via handler 220), the service itself 203 is instantiated (its program code is loaded into memory). The service 203 subsequently performs the service it is designed to perform and directs the resultant output product(s) via the inter process communication channel 202 to the handler 220 which presents them to the main execution block 201.

Figure 2D:
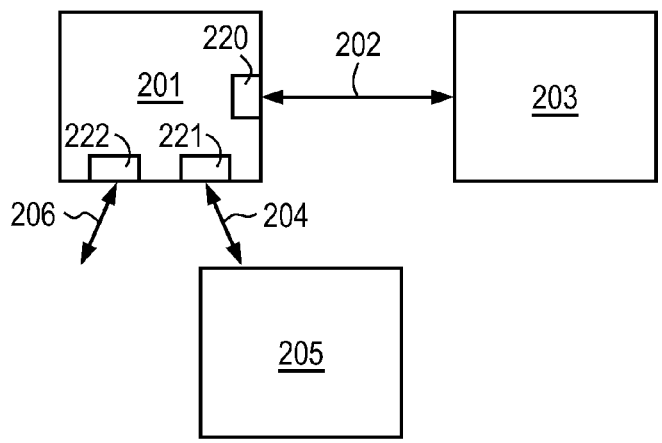

FIG. 2d shows the situation sometime later after the main execution block 201 has asked for two additional services, but as of the moment of FIG. 2d, has only actually issued a request to one of them (service 203). As such, inter-process communication channels 204, 206 have been constructed for both additional services (with handler 221, 222) but only the actually used service 205 has been instantiated. In one embodiment, each newly instantiated service is preferably instantiated on a process that is different than the respective processes of the previously instantiated services and the main execution block.

Figure 2E:
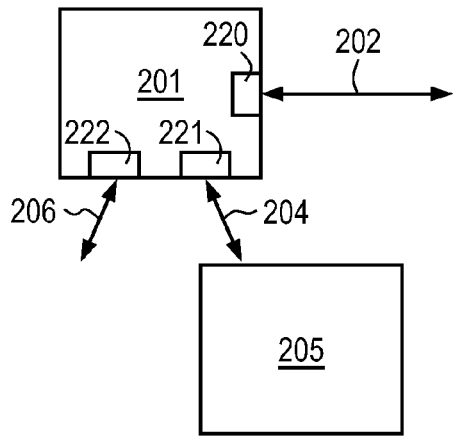
Figure 2F:
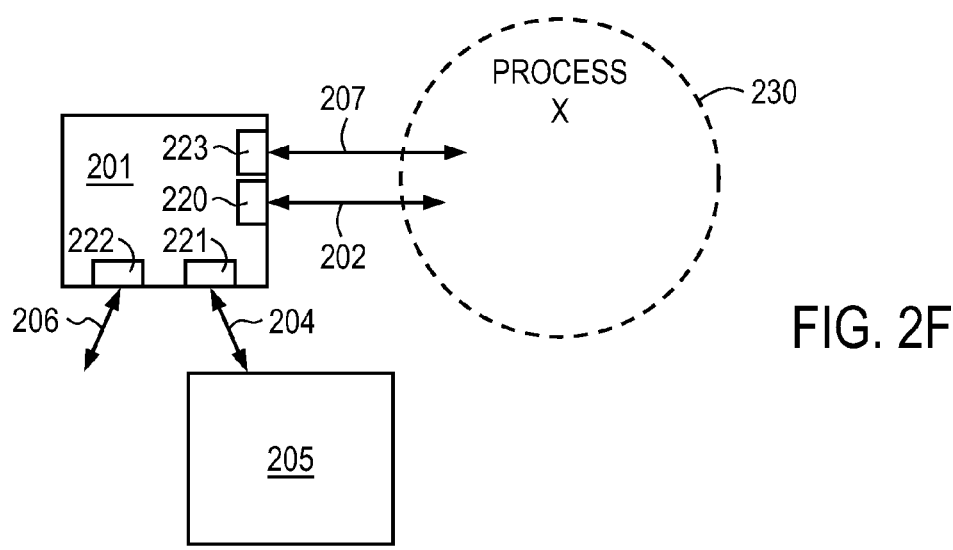

FIG. 2e shows a situation where the first instantiated service 203 has not been utilized for a specified time period. Noticeably, the service 203 is terminated (e.g., the memory space that holds its operable program code is permitted to be written over). Here, again, efficient memory usage is achieved as the services are instantiated if actually used and then terminated when actual usage appears to have ceased. With the service being terminated, the memory space of its operable code may be put to better use. For instance, the memory space of the terminated service's operable code may be replaced with the code of another software program including but not limited to another, different service for the application (either application developer supplied or part of the underlying platform).

Figure 2G:
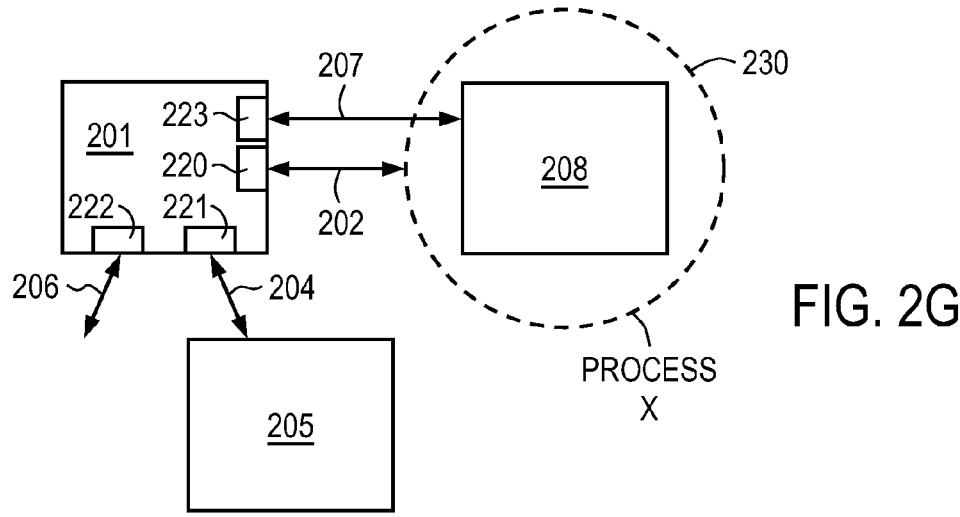

In the case where the service is replaced with another service 208 whose function is different than the previously called service 203 for the application, as observed in FIG. 2g, the main execution block 201 asks for the newer service 208. In response, in an embodiment, a second inter-process communication channel 207 with corresponding handler 223 is coupled between the main execution block 201 and the process 230 that was used to execute the first (now terminated) service. Here, as the different services are apt to accept different inputs, the main execution block 201 is provided with different handlers 220, 223 for the different services, which, from the main execution block's perspective corresponds to different communication channels (in fact, the underlying transport mechanism within the platform may be the same as between the two channels. In an implementation the handlers 220, 223 are performed by a single entity that renegotiate the channels (202, 207) between the different services. The application may generally be unaware of this transition from the handler/API perspective.

Figure 2H:
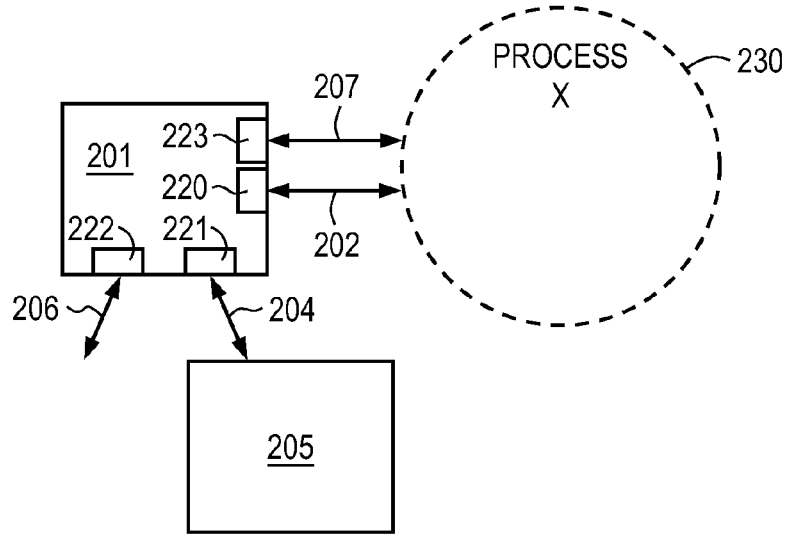

As discussed above, in an embodiment, upon the communication channel 207 to the newly asked service being instantiated in response to the main execution block's request for the newer service, the newer service is not actually instantiated until the main execution block actually requests the service's service. FIG. 2g shows the system after the main execution block 201 has actually issued a request for the new service 208 to the new handler 223 associated with communication channel 207. FIG. 2h shows the exemplary situation where, some time later, the newer service 208 has not been utilized for a time period and is terminated in response. Notably the handlers 220, 223 for each of the previously instantiated services of process 230 remain.

Recalling from above that services may be terminated if they are deemed not to be in use nor are expected to be used at least in the near term, in one embodiment, a hidden daemon within the platform monitors the usage of the individual services and makes the determination that a specific instantiated service should be terminated. According to one approach, for each instantiated service, the platform daemon increments a counter each time the main execution block issues a request to the service, and, decrements the counter each time the service responds to a particular request. The counter may be incremented/decremented by observing the behavior on a service's inter-process communication channel (e.g., by observing requests handled by the handler, observing the actual passage of the request between processes, observing the state of a service-side queue, etc.). In an embodiment, the service process itself keeps track of the counter (e.g., a default timeout value on the order of 30 seconds, but that is not a strict requirement). This is done by system code resident inside the service process (i.e. the library runtime support).

Notably, in an embodiment, requests to the individual services can be queued (e.g., at the service side process). As such, the counter is able to increment to values greater than one. For example, if a particular service entails fairly extensive (and therefore time lengthy) operations, the main execution block 201 may have multiple requests for the service before the service is able to respond to an initial request. Here, the main execution block 201 simply issues the requests are queued. The counter increments for each new request and therefore increases to a value greater than one. Note that a single process may be multi-threaded. In this case, multiple requests to a same process/service can be concurrently handled at least partially in parallel.

If no new requests are issued, at least until the service is able to respond to all the currently issued requests, the counter (which, again, is decremented for each response to a request generated by the service) will eventually decrement to zero—signifying that all issued requests have been responded to. As such, a counter value of zero corresponds to a service that is not currently being utilized. In an embodiment, the platform background daemon tracks the counter values, and, in response to a detected counter value of zero, starts a timer. In an embodiment, the timer is set to expire after a time period has passed beyond which is an indication that an application's state has moved to a point in which the application's need for the service is unlikely (e.g., according to one embodiment, 20 ms).

If a new request for the service is observed (or, said another way, the counter increments to a value of one or more) before the timer expires, the count is stopped and the timer is reset. If the counter is again observed to reach a value of zero the timer restarts set for expiration upon passing of the full time period and the process repeats. If the timer ever expires upon expiration of the full time period (which corresponds to the counter remaining at zero over the time period expanse of the timer), the service is terminated.

Figure 3:
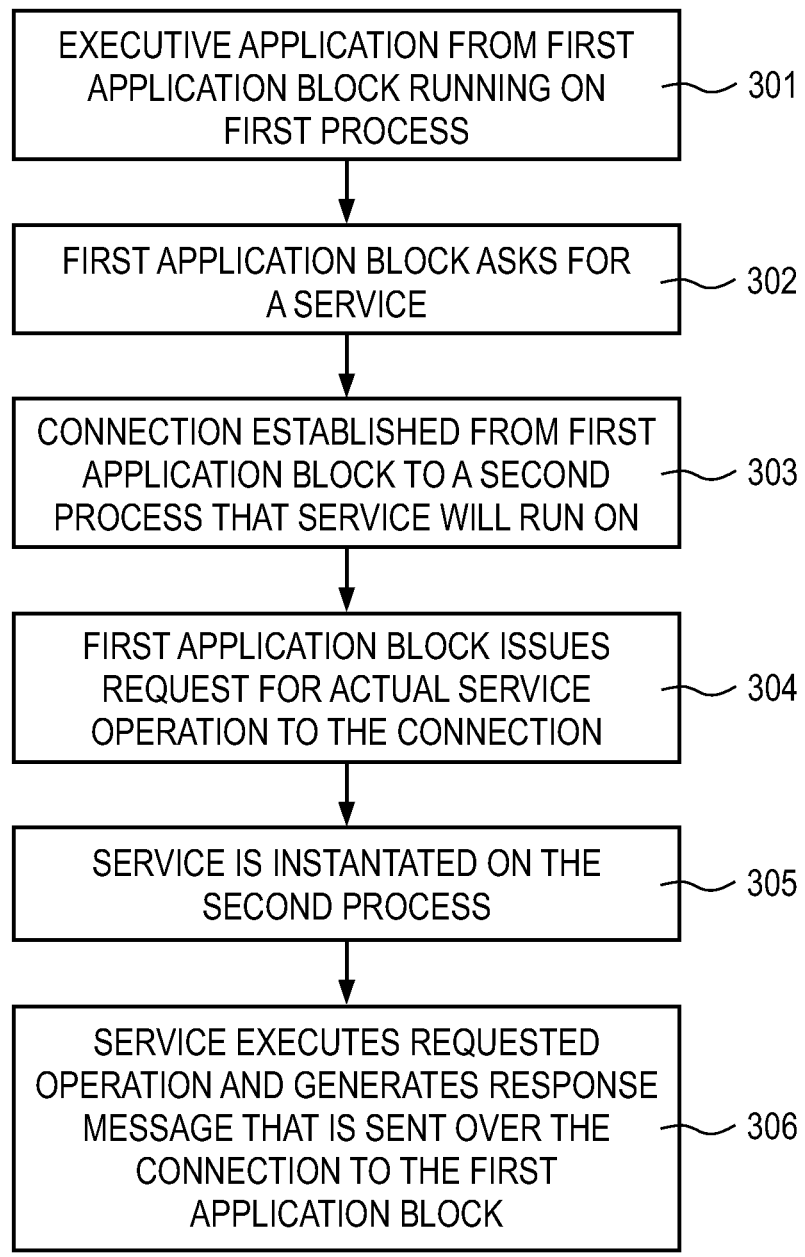
FIG. 3 shows a methodology that is demonstrated in the procedure of FIGS. 2a through 2e.
Figure 4A:
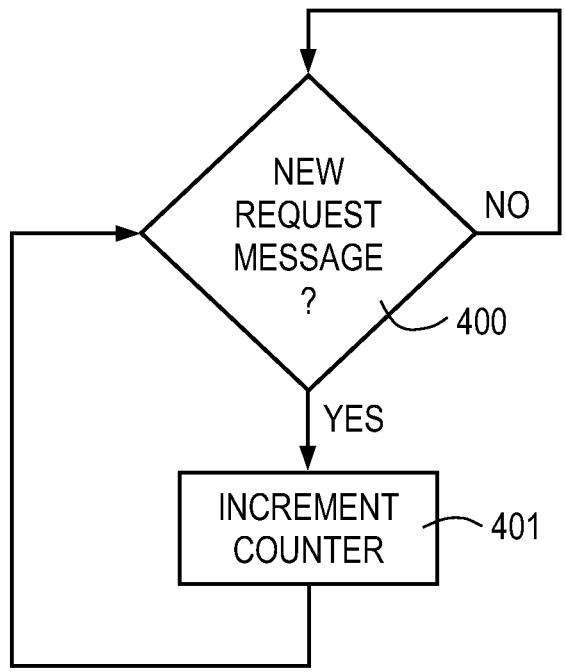
FIGS. 4a and 4b show processes for incrementing and decrementing a counter whose value is indicative of a service's usage.
Figure 4B:
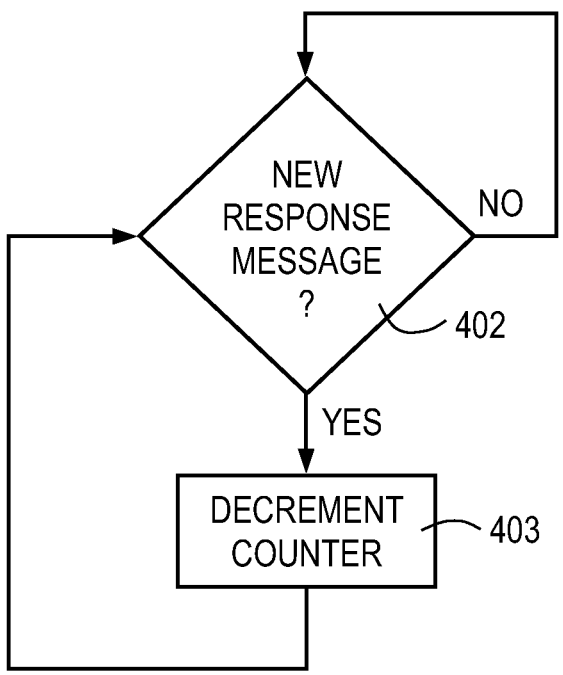
Figure 5:
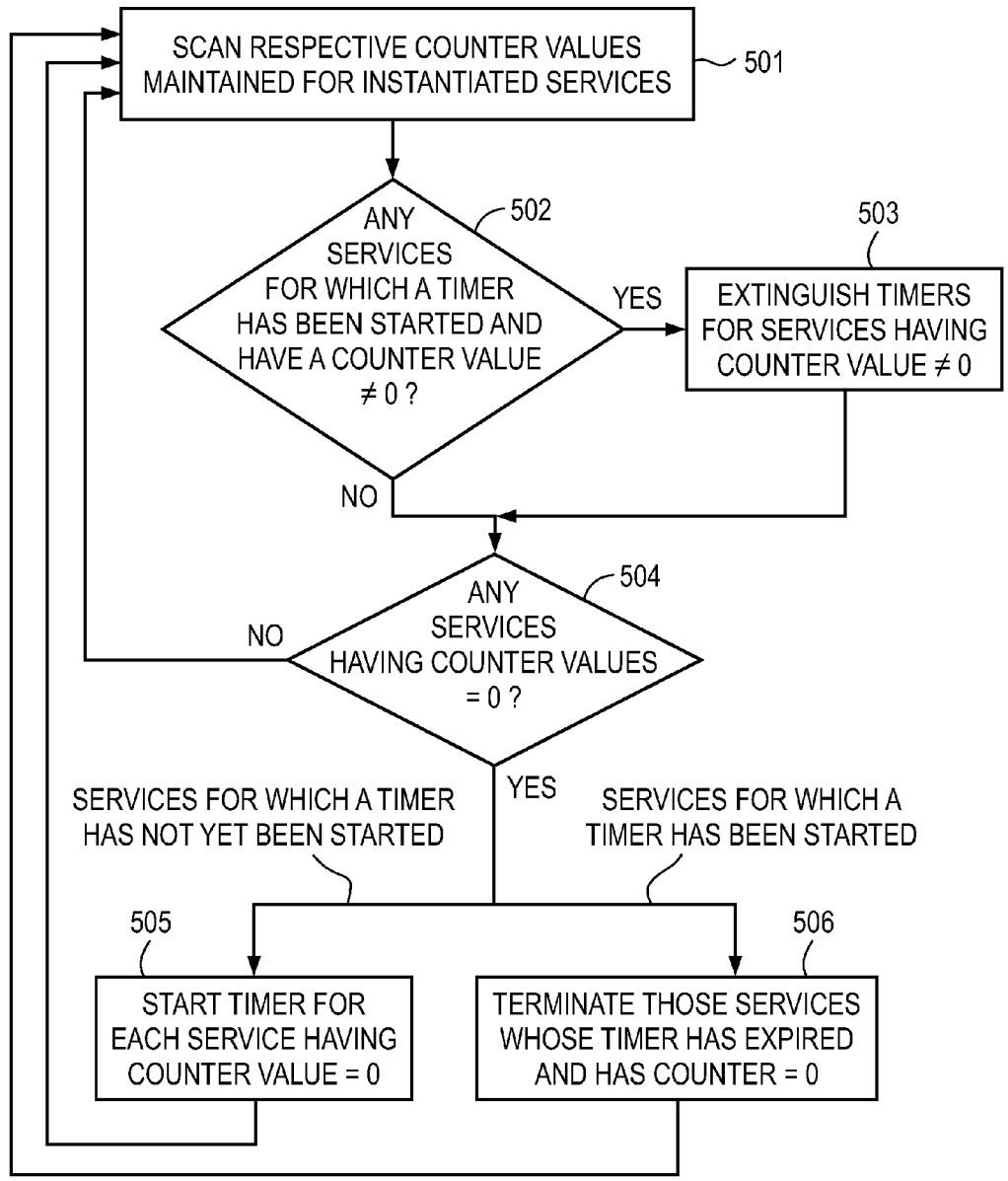
FIG. 5 shows a process for terminating services in view of their respective counter values.

FIGS. 3, 4 and 5 outline processes that can be gleaned from the description above. According to the process of FIG. 3, a first block of an application is run from a first process 301. The first application block then asks for a service 302. An inter process communication channel is constructed between the first block's process and another, second process 303. The first block issues a request for the service to the inter process communication channel 304. In response, the requested service is actually instantiated on the second process 305. The service executes the requested operation and generates a response message that is sent over the inter process communication channel to the first application block 306.

FIGS. 4a and 4b show processes for maintaining a counter that reflects the actual usage of a service. According to the process of FIG. 4a, a counter is incremented 401 when a new request message is submitted for a service, whereas, according to the process of FIG. 4b, the counter is decremented 403 when a response message is generated by the service. Execution of the pair or processes of FIGS. 4a and 4b together determine the counter's "current" value. Notably, in a further embodiment, in the case where a message indicates no response is expected, the counter is automatically decremented once the message has been received by the service.

FIG. 5 show a process for terminating one or more instantiated services. Respective counter values are maintained for each service (e.g., according to the processes described above with respect to FIGS. 4a and 4b). The respective counter values are scanned 501. Existing timers are extinguished for services having a timer (because the service's counter was previously equal to zero) but whose counter value has transitioned to a value greater than zero (because a new request message has recently been submitted to the service) 502, 503. A respective timer is started for each service having a counter value of zero and for which a timer has not yet been started 504, 505. Each service having a counter value of zero and for which a timer has been started is terminated 504, 506. In an embodiment, as discussed in paragraphs [0032] and [0034], the tracking is done within the service process and therefore does not necessitate scanning by an external daemon process. In this case, FIG. 5 can be modified to reflect the operation of a single process simply by referring to a singular counter value, timer and service rather than plural values, timers and services. In this case, different processes may execute in a non synchronized fashion (e.g., the scanning of respective counter values happen at different periods of time, etc.). An external daemon process may still be used to signal termination of services based on other factors than idle time out (such as low memory conditions, etc.).

Figure 6:
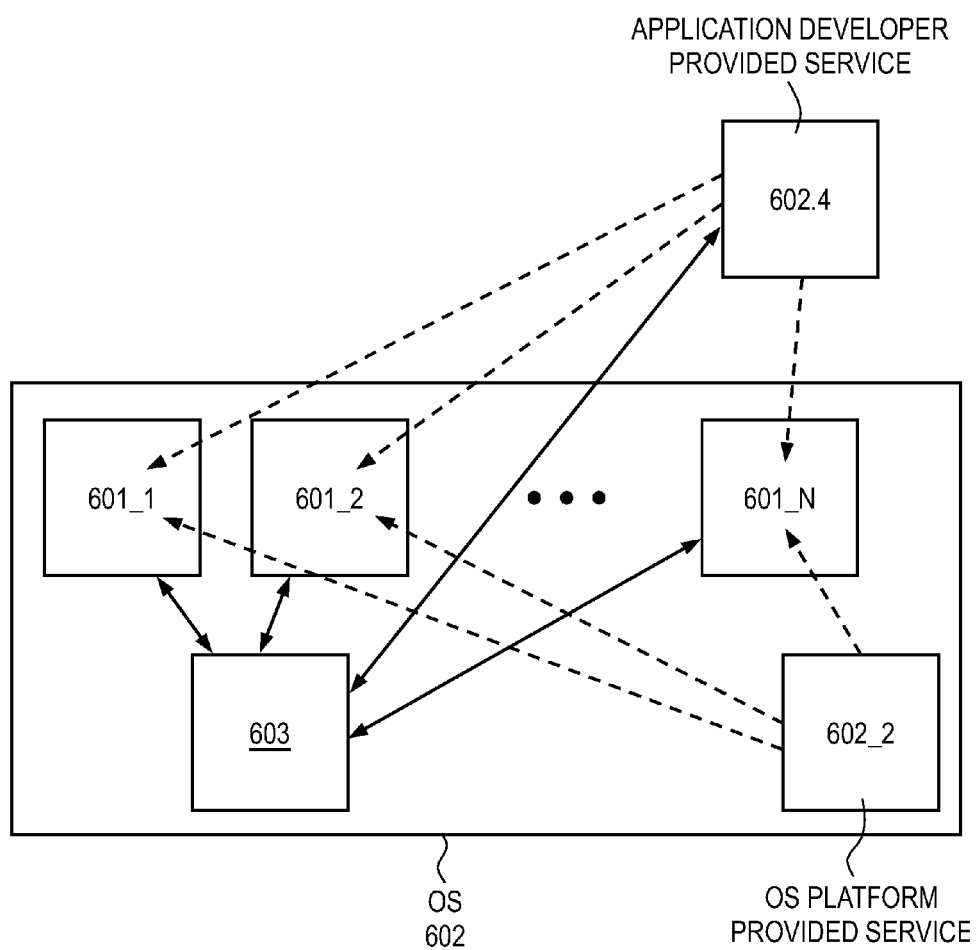
FIG. 6 shows an architectural diagram of a platform that supports multiple services on different processes where the services may be platform and/or application developer supplied.

FIG. 6 shows an architectural view of the above described system. According to the diagram of FIG. 6, there exist N multiple processes 601_1 through 601_N that different components or blocks of an application may run on when actually called upon. The operating system 602 runs across all of the processes and is capable of providing various services (e.g., services 602_2 and 602_4) on any one of these processes. In a more centralized approach, inter-process communication service 603 facilitates communication between the various processes/application components and/or also maintains a counter for each service to gauge the actual usage of each service including terminating those services that do not appear to be of use any longer.

In a more distributed approach, for example, in which the counter values for the various services are respectively maintained by the services themselves (e.g., as described above), the inter-process communication service 603 is designed to have visibility into the current counter values of the service processes. Based on criteria established by the system, inter-process communication service 603 can scan counter values and look for opportunities to terminate the various service processes. Here, the arrows from inter-process communication service 603 represent this visibility into the counters.

Figure 7A:
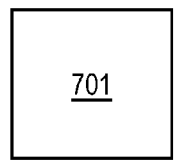
FIGS. 7a through 7e demonstrate a procedure by which a first service may call upon another service.
Figure 7B:
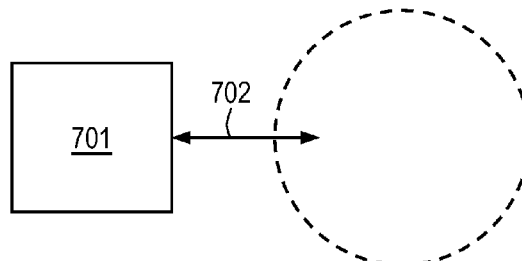

Recall from the discussion of FIG. 1 that a more centralized application architecture was discussed that included a main execution block 101 and individual services 102-108. In a purely centralized model, only the main execution block 101 calls on the services based on application needs or anticipated application needs determined by the main execution block. FIGS. 7a-7e show a more distributed approach in which a service is permitted to call upon another service. Referring to FIG. 7a, block 701 corresponds to a first block of application code running on a first process. At some execution point, observed in FIG. 7b, block 701 asks for a first service. In response, an inter-process communication channel 702 is established to a second process. In an embodiment, the inter-process communication channel 702 is established at least in part with a handler and corresponding API that is instantiated on the first process.

Figure 7C:
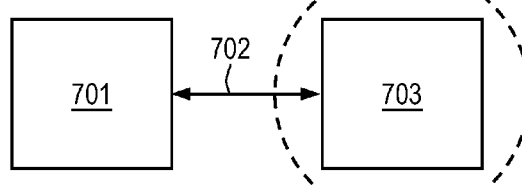
Figure 7D:
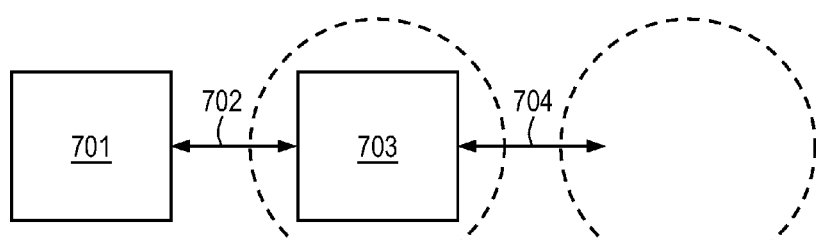

Upon an actual message being constructed for the first service by the first block of application code 701, as observed in FIG. 7c, the first service 703 is instantiated on the second process. At some execution point, observed in FIG. 7d, first service 703 asks for a second service. In response, an inter-process communication channel 704 is established to a third process. In an embodiment, the inter-process communication channel 704 is established at least in part with a handler and corresponding API that is instantiated on the second process.

Figure 7E:
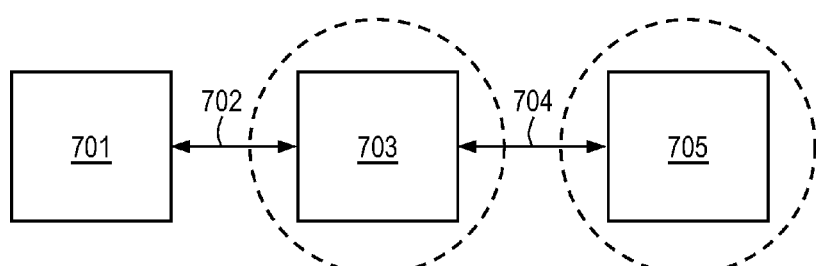

Upon an actual message being constructed for the second service 705 by the first service 703, as observed in FIG. 7e, the second service 705 is instantiated on the third process. Thus, in contrast to FIG. 1, where all inter-process communication channels reside between a main execution block 701 and the application's individual services, in FIG. 7e, an inter-process communication channel 704 can reside between services, or, at least, not all inter-process communication channels need to reside between one block of code and all other blocks of code.

In an embodiment, in order for the first service 703 to ask for the second service 705, the first service 703 needs to be aware of the second service 705. Thus, according to one approach, as part of the start-up/instantiation of first service 703, the other services of the application (including service 705) are advertised to the first service 703. Thus, whereas in a purely centralized approach (e.g., as observed in FIG. 1) it is possible to only advertise available services to the main execution block, by contrast, in a more distributed approach, individual services may be made aware of other individual services.

Furthermore, as described at length above any one of services 703, 705 may be terminated if a determination is made that a service is not being utilized. For example, as discussed above, a counter may be maintained for each of services 703, 705 that increments with each new request message for the service and decrements with each response provided by the service. If the counter value for a service remains at zero over a specific time period the service is terminated.

Figure 8:
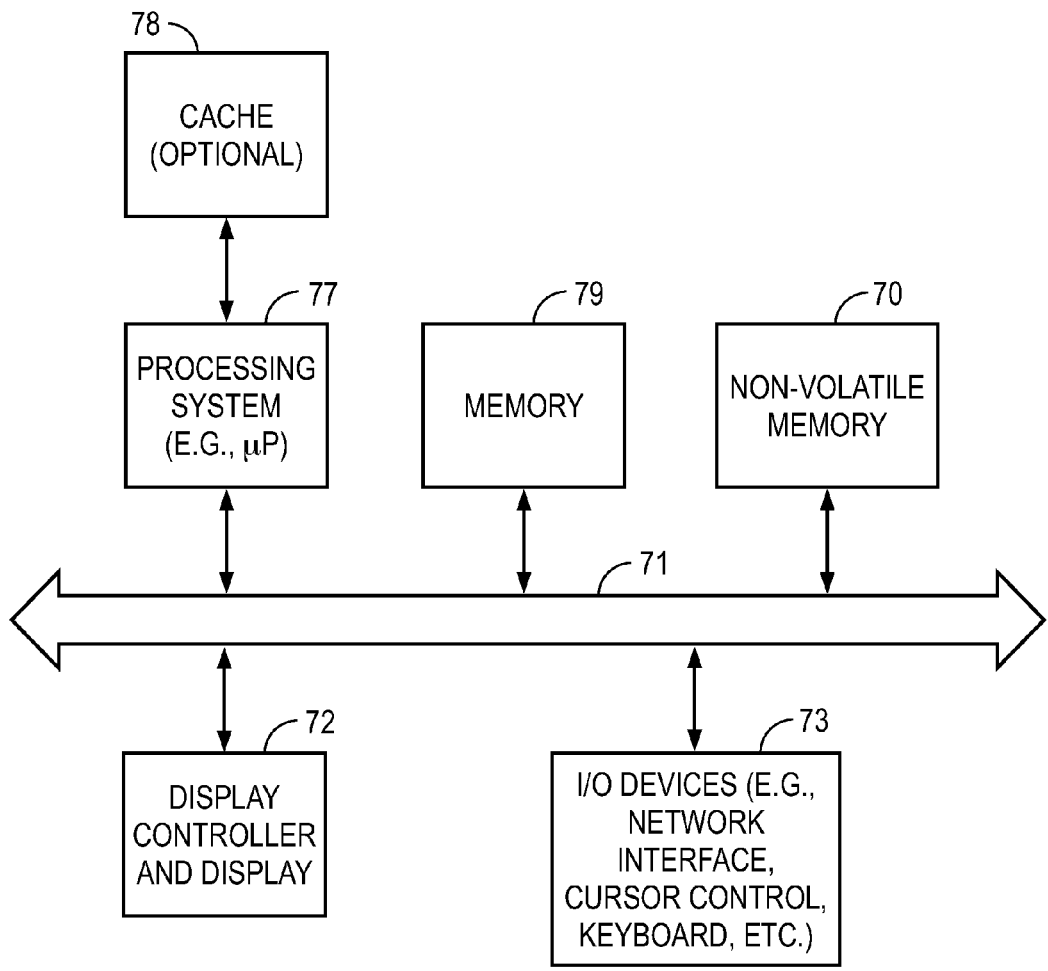
FIG. 8 shows an embodiment of a computing system.

FIG. 8 shows an exemplary architecture for a computing system such as a desktop, laptop, notebook, netbook, tablet or smartphone system. As shown in FIG. 8, the computing system, which is a form of a data processing system, includes a bus 71 (and/or or other form of interconnect such as point-to-point mesh), which is coupled to a processing system 77 and a volatile memory 79 and a non-volatile memory 70. The processing system 77 may include a processing unit which is coupled to an optional cache 78. The processing unit may be composed or multiple processor(s) and/or processing core(s) to effect multi-threaded operation.

The bus 71 interconnects these various components together and also interconnects these components to a display controller and display device 72 and to peripheral devices such as input/output (I/O) devices 73 which may include a touchscreen, network interfaces, and other devices which are well known in the art. Typically, the input/output devices 73 are coupled to the system through input/output controllers. The volatile memory 79 is typically implemented as dynamic RAM (DRAM) which requires power continually in order to refresh or maintain the data in the memory. The nonvolatile memory 70 is typically a magnetic hard drive or a flash semiconductor memory, or a magnetic optical drive or other type of memory systems which maintain data (e.g. large amounts of data) even after power is removed from the system. Typically, the nonvolatile memory 70 will also be a random access memory although this is not required.

While FIG. 8 shows that the nonvolatile memory 70 is a local device coupled directly to the rest of the components in the data processing system, it will be appreciated that the present invention may utilize storage which is remote from the system, such as a network storage device which is coupled to the data processing system through a network interface. The bus 71 may include one or more buses connected to each other through various bridges, controllers and/or adapters as is well known in the art. Alternatively, the bus may be replaced with a mesh or other arrangement of point-to-point links.

It will be apparent from this description that aspects of the present invention may be embodied, at least in part, in software. That is, the techniques may be carried out in a computing system in response to its processor(s)/processing core(s), executing sequences of instructions contained in a machine readable storage medium such as a memory (e.g. memory 79 and/or memory 70). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system 77.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer-implemented method, comprising:
    launching an application for execution by a processor in a first process, wherein the application includes a plurality of blocks of program code, wherein a first block of program code is loaded in memory for the first process without loading other blocks of program code in memory when the application is launched;
    scanning the application to identify one or more services provided to the application by the other blocks of program code;
    making the services identified available to the first block in the first process, the services including a service provided by a second block;
    in response to a request received via the first block in the first process for one of the available services, instantiating an instance of code to handle delivery of inter process requests from said first block to said second block, the instance of code providing an application programming interface (API) to allow the first block to access the second block;
    in response to said instance of code receiving a first request from said first block for said service,
        instantiating said second block for execution within a second process that is different than the first process within which the first block is executed, and
        incrementing, by the instance of code, a counter associated with the second process;
    in response to a first response to the first request received from the second block representing a result of the service performed based on the first request, decrementing the counter by the instance of code; and
    terminating said second block in response to determining that the counter reaches a predetermined value and no new request has been received by the second block for a predetermined period of time.

2. The method of claim 1 wherein said instance of code comprises a handler.

3. The method of claim 1 wherein said first block of program code is said application's main execution block.

4. The method of claim 1 wherein said method further comprises, after said termination of said second block of program code, keeping said instance of code operational.

5. The method of claim 4 wherein said method further comprises:
    in response to said instance of code receiving a second request from said first block for said second block, re-instantiating said second block for execution with said different process.

6. The method of claim 1 wherein said service and corresponding second block of program code is provided by a provider of a platform upon which said application operates.

7. The method of claim 6 further comprising:
    receiving a second indication that said first block desires availability of a second service provided by a third of said blocks;
    in response to said receipt of said second indication, instantiating an instance of second code to handle the delivery of inter process requests from said first block to said third block;
    in response to said instance of second code receiving a request from said first block for said third block, instantiating said third block for execution with another process that is a different process than said first and second blocks' respective processes.

8. The method of claim 7 wherein one of said second and third blocks of code are written by a developer of the application and the other of said second and third blocks of code are written by a provider of a platform upon which said application operates.

9. A non-transitory machine readable storage medium containing program code that when processed by a processing unit of a computing system causes a method to be performed by said computing system, said method comprising:
    launching an application for execution by a processor in a first process, wherein the application includes a plurality of blocks of program code, wherein a first block of program code is loaded in memory for the first process without loading other blocks of program code in memory when the application is launched;
    scanning the application to identify one or more services provided to the application by the other blocks of program code;
    making the services identified available to the first block in the first process, the services including a service provided by a second block;
    in response to a request received via the first block in the first process for one of the available services, instantiating an instance of code to handle delivery of inter process requests from the first block to the second block, the instance of code providing an application programming interface (API) to allow the first block to access the second block;
    in response to the instance of code receiving a first request from the first block for the service,
        instantiating the second block for execution within a second process that is different than the first process within which the first block is executed, and
        incrementing, by the instance of code, a counter associated with the second process;
    in response to a first response to the first request received from the second block representing a result of the service performed based on the first request, decrementing the counter by the instance of code; and
    terminating the second block in response to determining that the counter reaches a predetermined value and no new request has been received by the second block for a predetermined period of time.

10. The machine readable storage medium of claim 9 wherein said instance of code comprises a handler.

11. The machine readable storage medium of claim 9 wherein said first block of program code is said application's main execution block.

12. The machine readable storage medium of claim 9 wherein said method further comprises, after said termination of said second block of program code, keeping said instance of code operational.

13. The machine readable storage medium of claim 12 wherein said method further comprises:
in response to said instance of code receiving a second request from said first block for said second block, re-instantiating said second block for execution with said different process.

14. The machine readable storage medium of claim 9 wherein said service and corresponding second block of program code is provided by a provider of a platform upon which said application operates.

15. The machine readable storage medium of claim 14 wherein said method further comprises:
receiving a second indication that said first block desires availability of a second service provided by a third of said blocks;
in response to said receipt of said second indication, instantiating an instance of second code to handle the delivery of inter process requests from said first block to said third block;
in response to said instance of second code receiving a request from said first block for said third block, instantiating said third block for execution with another process that is a different process than said first and second blocks' respective processes.

16. The machine readable storage medium of claim 15 wherein one of said second and third blocks of code are written by a developer of the application and the other of said second and third blocks of code are written by a provider of a platform upon which said application operates.

17. A computing system having a machine readable storage medium containing program code that when processed by a processing unit of said computing system causes a method to be performed by said computing system, said method comprising:
launching an application for execution by a processor in a first process, wherein the application includes a plurality of blocks of program code, wherein a first block of program code is loaded in memory for the first process without loading other blocks of program code in memory when the application is launched;
scanning the application to identify one or more services provided to the application by the other blocks of program code;
making the services identified available to the first block in the first process, the services including a service provided by a second block;
in response to a request received via the first block in the first process for one of the available services, instantiating an instance of code to handle delivery of inter process requests from the first block to the second block, the instance of code providing an application programming interface (API) to allow the first block to access the second block;
in response to the instance of code receiving a first request from the first block for the service,
instantiating the second block for execution within a second process that is different than the first process within which the first block is executed, and
incrementing, by the instance of code, a counter associated with the second process;
in response to a first response to the first request received from the second block representing a result of the service performed based on the first request, decrementing the counter by the instance of code; and
terminating the second block in response to determining that the counter reaches a predetermined value and no new request has been received by the second block for a predetermined period of time.

18. The computing system of claim 17 wherein said instance of code comprises a handler.

19. The computing system of claim 17 wherein said first block of program code is said application's main execution block.

20. The computing system of claim 17 wherein said method further comprises, after said termination of said second block of program code, keeping said instance of code operational.

21. The computing system of claim 20 wherein said method further comprises:
in response to said instance of code receiving a second request from said first block for said second block, re-instantiating said second block for execution with said different process.

22. The computing system of claim 18 wherein said service and corresponding second block of program code is provided by a provider of a platform upon which said application operates.

23. The computing system of claim 22 wherein said method further comprises:
receiving a second indication that said first block desires availability of a second service provided by a third of said blocks;
in response to said receipt of said second indication, instantiating an instance of second code to handle the delivery of inter process requests from said first block to said third block;
in response to said instance of second code receiving a request from said first block for said third block, instantiating said third block for execution with another process that is a different process than said first and second blocks' respective processes.

24. The computing system of claim 23 wherein one of said second and third blocks of code are written by a developer of the application and the other of said second and third blocks of code are written by a provider of a platform upon which said application operates.

25. A non-transitory machine readable storage medium containing program code that when processed by a processing unit of a computing system causes a method to be performed by said computing system, said method comprising:
launching an application for execution by a processor in a first process, wherein the application includes a plurality of blocks of program code, wherein a first block of program code is loaded in memory for the first process without loading other blocks of program code in memory when the application is launched;
scanning the application to identify one or more services provided to the application by the other blocks of program code;
making the services identified available to the first block in the first process, the services including a service provided by a second block;

in response to a request received via the first block in the first process for one of the available services, instantiating an instance of code to handle delivery of inter process requests from the first block to the second block, the instance of code providing an application programming interface (API) to allow the first block to access the second block;

in response to the instance of code receiving a first request from the first block for the service, instantiating the second block for execution within a second process that is different than the first process within which the first block is executed;

detecting that the second block has no pending requests to provide a service and detecting that the second block has not, over a period of time, received any new requests for the service; and terminating the second block in response to the detectings.

26. The machine readable storage medium of claim 25 wherein said instance of code comprises a handler.

27. The machine readable storage medium of claim 25 wherein said first block of program code is said application's main execution block.

28. The machine readable storage medium of claim 25 wherein said method further comprises, after said termination of said second block of program code, keeping said instance of code operational.

29. The machine readable storage medium of claim 26 wherein said method further comprises:

in response to said instance of code receiving a second request from said first block for said second block, re-instantiating said second block for execution with a different process.

30. The machine readable storage medium of claim 25 wherein said service and corresponding second block of program code is provided by a provider of a platform upon which said application operates.

\* \* \* \* \*